United States Patent [19]

Gauron

[11] Patent Number: 5,378,099
[45] Date of Patent: Jan. 3, 1995

[54] INSET PANEL FASTENER WITH SHOULDER-ENGAGING FLOATING MEMBER

[76] Inventor: Richard F. Gauron, 1400 19th Ave. NW., Issaquah, Wash. 98027

[21] Appl. No.: 86,547

[22] Filed: Jul. 1, 1993

[51] Int. Cl.⁶ .................. F16B 39/02; F16B 37/04
[52] U.S. Cl. ..................... 411/82; 411/108; 411/258
[58] Field of Search ............... 411/82, 112, 113, 258, 411/180, 930, 108

[56] References Cited

U.S. PATENT DOCUMENTS

| | | |
|---|---|---|
| 2,235,078 | 3/1941 | Meisterhans . |
| 3,019,865 | 2/1962 | Rohe ................... 189/34 |
| 3,313,078 | 4/1967 | Rohe ................... 52/617 |
| 3,339,609 | 9/1967 | Cushman . |
| 3,504,723 | 4/1970 | Cushman et al. . |
| 3,621,557 | 11/1971 | Cushman et al. ........... 29/460 |
| 3,646,981 | 3/1972 | Barnes . |
| 3,646,982 | 3/1972 | Cushman . |
| 3,662,805 | 5/1972 | Sygnator . |
| 3,695,324 | 10/1972 | Gulistan . |
| 3,964,531 | 6/1976 | Schenk . |
| 4,227,561 | 10/1980 | Molina . |
| 4,341,053 | 7/1982 | Dettfurth et al. ........... 411/82 X |
| 4,417,028 | 11/1983 | Azevedo ................. 525/285 |
| 4,812,193 | 3/1989 | Gauron .................. 156/293 |
| 4,973,208 | 11/1990 | Gauron .................. 411/82 |
| 5,082,405 | 1/1992 | Witten .................. 411/82 |

*Primary Examiner*—Neill R. Wilson
*Attorney, Agent, or Firm*—Joan H. Pauly

[57] ABSTRACT

A fastener element (2) has first and second body portions (10, 34) that are mechanically interlocked. The portions (10, 34) define an axial opening (12, 14) that opens onto a radial end surface (25) of the body (10, 34). One portion (10) has a radial shoulder (32) facing away from the end surface (25) and defining an increased width inner portion (14) of the axial opening. A floating member (56) positioned in the axial opening (12, 14) has an outer end (66) adjacent to the end surface (25) and an opposite inner end with a head (60) that is received in the inner portion (14) and abuts the shoulder (32) to transmit axial loads created by engagement of the member (56) by a fastener. Flow passageways (18) are formed around the element (2), which is molded in a core cavity (88) in a honeycomb panel (80) using potting material (96).

6 Claims, 3 Drawing Sheets

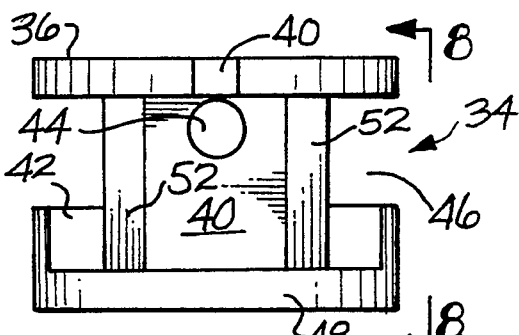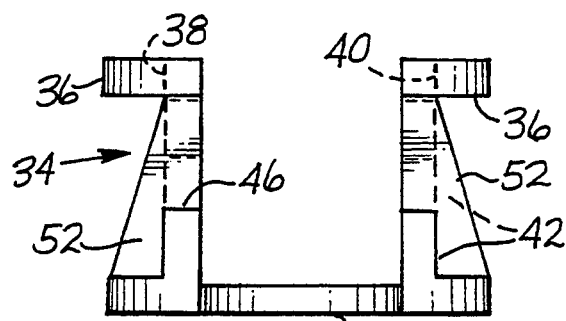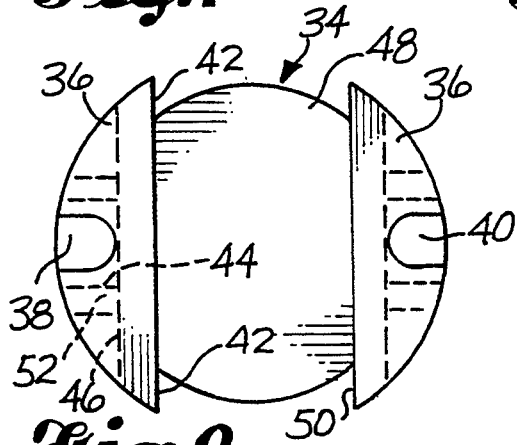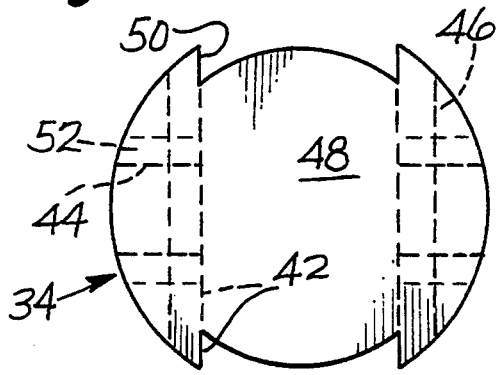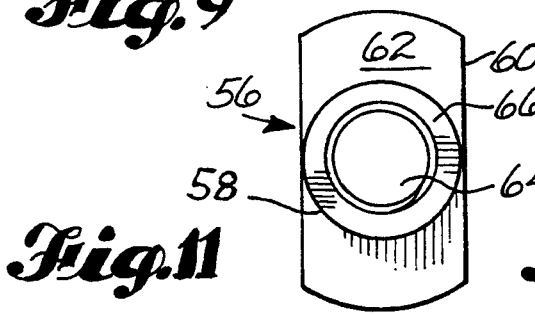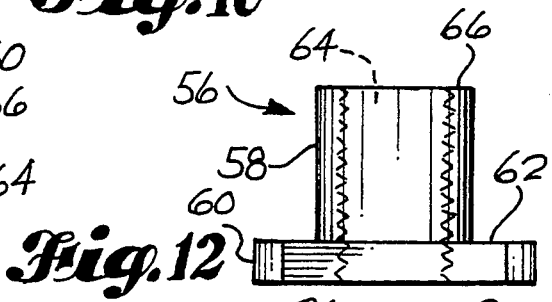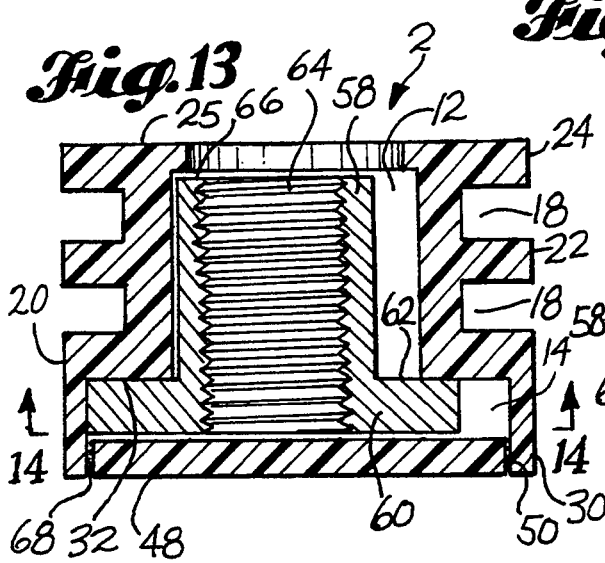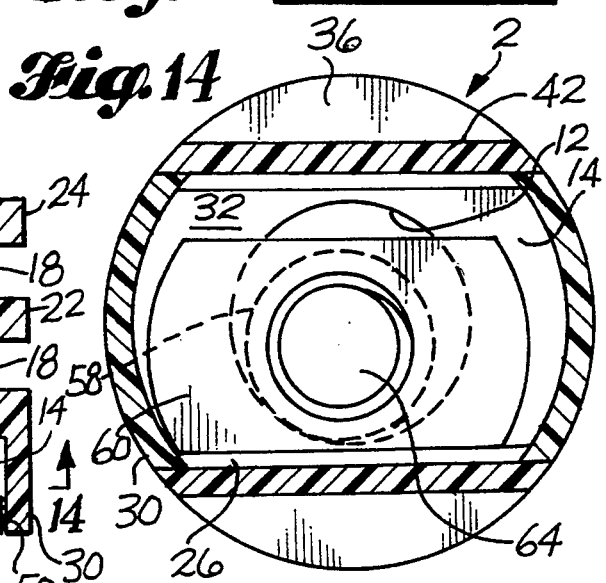

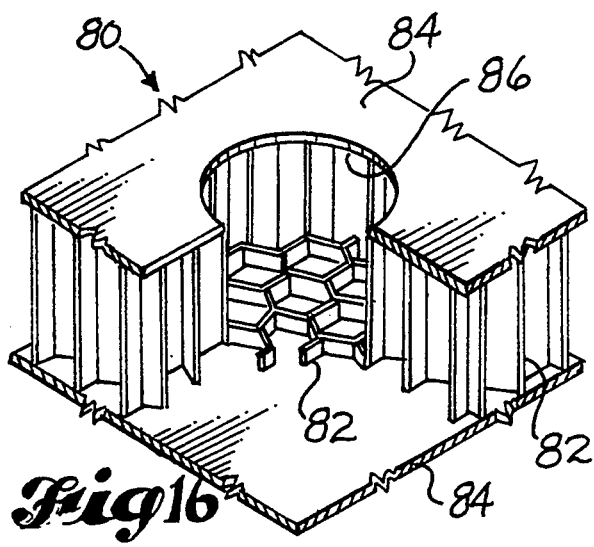
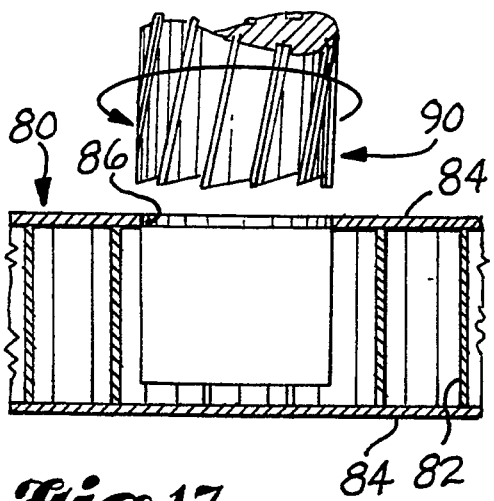
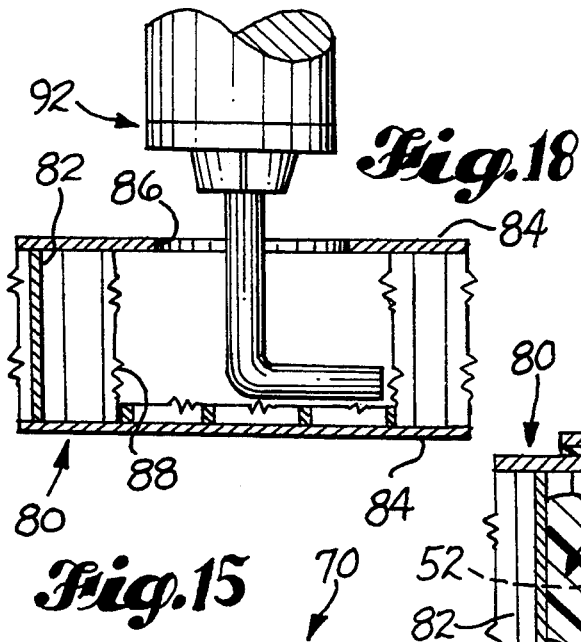
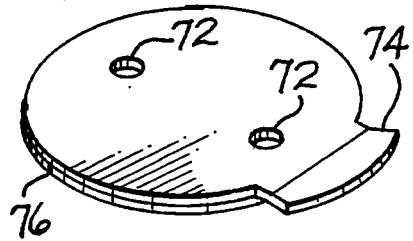
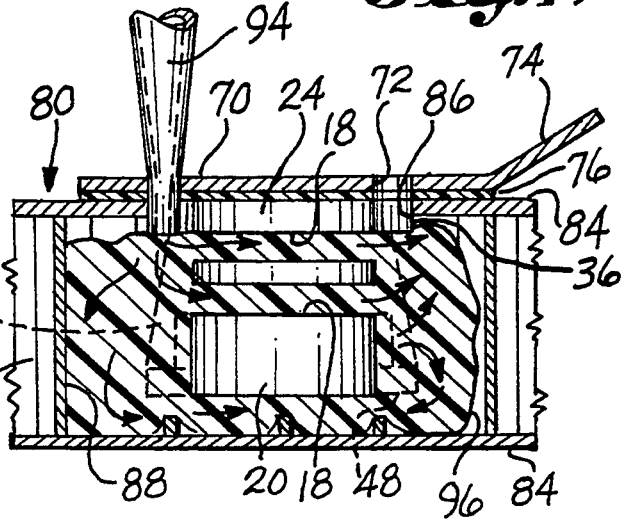
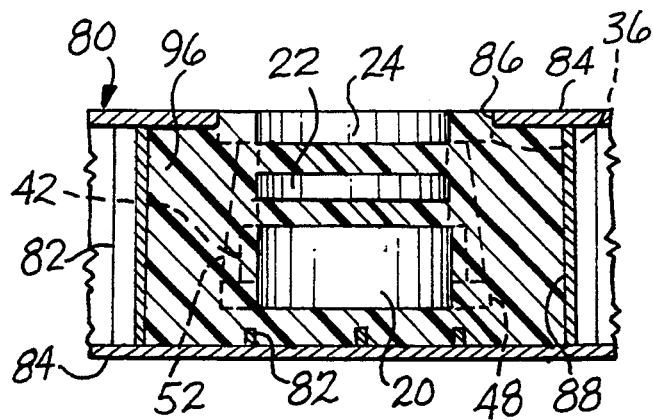

INSET PANEL FASTENER WITH SHOULDER-ENGAGING FLOATING MEMBER

TECHNICAL FIELD

This invention relates to inset fastener elements and, more particularly, to such an element having a floating fastener-engaging member to automatically adjust for misalignments between a structure and an object attached thereto, said floating member having a head that engages a shoulder formed by the body of the fastener element to transmit fastener loads from the member to the body.

BACKGROUND INFORMATION

Inset-type fastener elements are useful for connecting various types of structures to other structures or objects. An inset fastener element is generally anchored into a structure and has an engagement portion to which a screw fastener or the like is secured in order to connect an object to the structure. This arrangement is particularly advantageous when a strong connection between the structure and the object cannot readily be obtained by securing the fastener directly to the structure without an intervening fastener element.

Sandwich panels of the type used extensively in the aircraft and marine industries are one type of structure which is commonly connected to other structures or objects by use of inset fastener elements. In order to provide a secure anchor in the cellular honeycomb core of the panel, the inset fastener element is molded into a cavity formed in the core by use of a binding (potting) material. In such molded-in installations, it is difficult to precisely align the fastener element with the fastener receiving hole or other engagement means in the object or structure to be connected to the panel. One way of compensating for the difficulty in obtaining alignment is to allow the fastener element to automatically adjust for misalignments by providing a fastener element with a floating member.

Inset fastener elements having floating members that automatically adjust for misalignments are disclosed in U.S. Pat. No. 4,973,208, granted Nov. 27, 1990, to the present inventor; U.S. Pat. No. 3,504,723, granted Apr. 7, 1970, to K. V. Cushman et al.; and U.S. Pat. No. 3,339,609, granted Sep. 5, 1967, to K. V. Cushman. The fastener element disclosed in each of these patents has an outer disk portion that reacts loads imposed on the floating member by the fastener. The outer disk has an inwardly facing radial surface that engages an outer radial surface of the floating member to transmit the forces. In this type of arrangement, the ability of the fastener element to react the forces without structural damage to the element depends on the strength of the outer disk and its connections to other portions of the element. The primary object of the present invention is to provide an inset fastener element with a floating member that provides greater strength and capability of reacting loads than known fastener elements, such as those disclosed in the three patents cited herein.

DISCLOSURE OF THE INVENTION

The present invention provides an improved fastener element receivable into an opening in a structure and adapted to cooperate with a screw fastener or the like to connect an object to the structure. According to an aspect of the invention, the fastener element comprises a body, anchoring portions, and a floating member. The body includes a first portion and a second portion mechanically interlocked with the first portion. The two portions together define an axial opening having an outer end that opens onto a radial end surface of the body. One of the portions has a radial shoulder facing away from the outer end of the axial opening and defining an increased width inner portion of the axial opening. The anchoring portions are carried by the body and interlock with the structure to anchor the fastener element in the opening in the structure. The floating member is positioned in the axial opening and includes an engagement portion, an outer end positioned adjacent to the outer end of the axial opening, and an opposite inner end including a head. The engagement portion is aligned with the outer end of the axial opening for engaging a fastener. The head is received in the inner portion of the axial opening and has a radial surface confronting the shoulder to transmit axial loads created by engagement of the member by a fastener from the member to the body. The floating member and the axial opening are shaped and dimensioned to substantially prevent rotation of the member in the axial opening while permitting radial movement of the member in the axial opening to automatically adjust for misalignments between the structure and the object.

The configurations of the floating member and the axial opening may be varied. In the currently preferred form of the fastener element, each of the floating member and the axial opening is generally T-shaped and has a generally cylindrical outer portion with a diameter. The inner portion of the axial opening and the head of the floating member each has a first lateral dimension at least as great as this diameter and a second lateral dimension perpendicular to and greater than the first lateral dimension.

According to another aspect of the invention, the fastener element is for molded-in installation, by use of a binding material, into a cavity in a structure. The element is receivable into the cavity and adapted to cooperate with a screw fastener or the like to connect an object to the structure. The element comprises a body, anchoring portions, and a floating member, as described above. The anchoring portions interlock with the binding material to retain the fastener element in position in the cavity. The first and second portions of the body cooperate to exclude the binding material from the axial opening to prevent hindrance of the radial movement of the floating member by the binding material.

In the preferred embodiment, the body has outer flange portions with a fill opening and a vent opening extending through diametrically opposite peripheral portions thereof on opposite sides of the outer end of the axial opening. One of the body portions includes two circumferentially spaced sections that form flow passageways around the body. The other body portion includes reduced diameter substantially flat axial surfaces and strengthening ribs. The axial surfaces are positioned circumferentially between the sections that form the flow passageways and radially inwardly of the fill opening and the vent opening, respectively. The strengthening ribs are formed on the axial surfaces and taper radially inwardly as they extend axially outwardly to facilitate flow of binding material around the body and through the passageways. The flow passageway and strengthening rib features are preferably provided in further combination with the T-shaped configuration described above. In such case, the second lateral dimension is preferably substantially parallel to the axial surfaces.

The invention accomplishes the goal of increasing the strength and load reacting capability of an inset fastener element with a floating member that engages a fastener. In the fastener element of the invention, the loads are reacted by an inwardly facing shoulder defining an inner portion of the axial opening, rather than by an outer end disk. Thus, a greater portion of the body of the element resists the fastener loads to accomplish the desired increased strength and load carrying capability. In the preferred embodiment of the invention, the fastener element's load carrying capabilities are further increased by the strengthening ribs. The preferred tapering configuration of the ribs provides the increased strength while avoiding unacceptable hindrance of flow of binding material around the body and through the flow passageways. The combination of features of the preferred embodiment is designed to maximize the strength of the fastener element while retaining superior anchoring characteristics.

These and other advantages and features will become apparent from the detailed description of the best mode for carrying out the invention that follows.

BRIEF DESCRIPTION OF THE DRAWINGS

In the drawings, like element designations refer to parts throughout, and:

FIG. 7 is an elevational view of the second body portion shown in FIGS. 1 and 2.

FIG. 8 is an elevational view taken along the line 8—8 in FIG. 7.

FIGS. 9 and 10 are top and bottom plan views, respectively, of the body portion shown in FIGS. 7 and 8.

FIG. 11 is a top plan view of the floating member shown in FIG. 2.

FIG. 12 is an elevational view of the floating member.

FIG. 13 is a sectional view of the assembled fastener element shown in FIG. 1.

FIG. 14 is a sectional view taken along the line 14—14 in FIG. 13.

FIG. 15 is a pictorial view of a positioning tab used for installing the fastener element of the invention.

FIG. 16 is a pictorial view of a portion of a honeycomb panel having an opening formed therein.

FIG. 17 is a sectional view illustrating the forming of the opening using a cutting bit, with the bit shown in elevation.

FIG. 18 is like FIG. 17 except that it illustrates an enlarged cavity being formed in the honeycomb core using a reamer.

FIG. 19 is a sectional view illustrating the injection of potting resin to install the fastener element in the cavity, with parts shown in elevation.

FIG. 20 is an elevational view showing the fastener element installed in the cavity, with the element shown in elevation.

BEST MODE FOR CARRYING OUT THE INVENTION

The drawings show a fastener element 2 that is constructed according to the invention and that constitutes the best mode for carrying out the invention currently known to the applicant. The fastener element of the invention may be used in connection with various types of structures and is particularly advantageous for use with structures to which it is difficult to directly attach a screw fastener or the like, and in situations where precise alignment between a structure and an object to be connected thereto is difficult to achieve. It is presently anticipated that the primary use of the fastener element of the invention will be in molded-in installations in the type of honeycomb core panel 80 illustrated in FIGS. 16–20.

Figure 1:
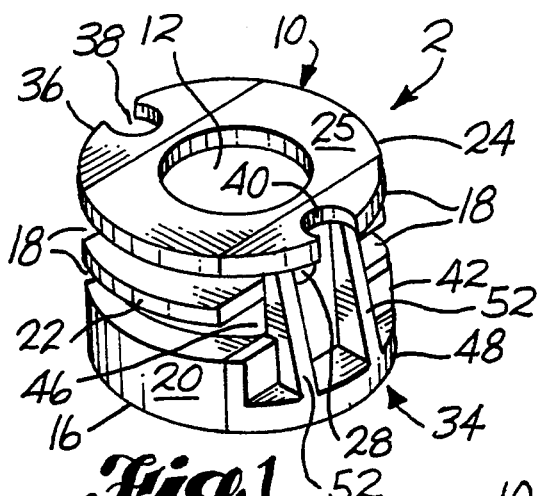
FIG. 1 is a pictorial view of the preferred embodiment of the fastener element of the invention, with the parts of the element shown assembled together.
Figure 3:
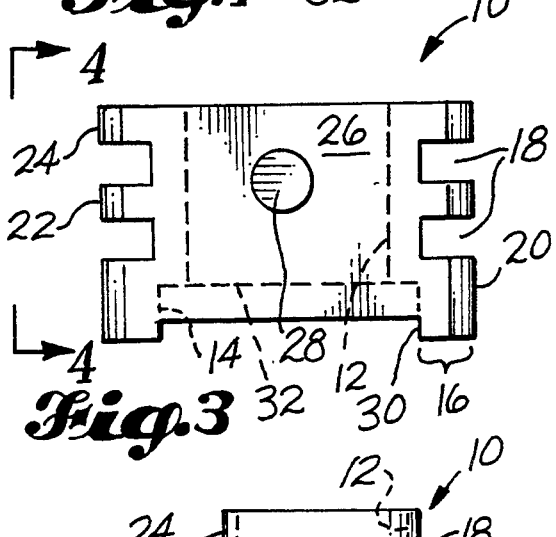
FIG. 3 is an elevational view of the first body portion shown in FIGS. 1 and 2.
Figure 4:
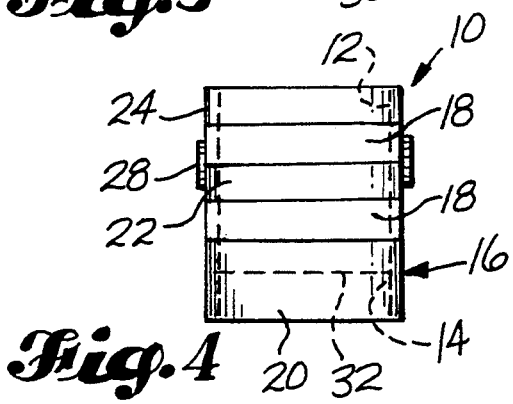
FIG. 4 is an elevational view taken along the line 4—4 in FIG. 3.
Figure 2:
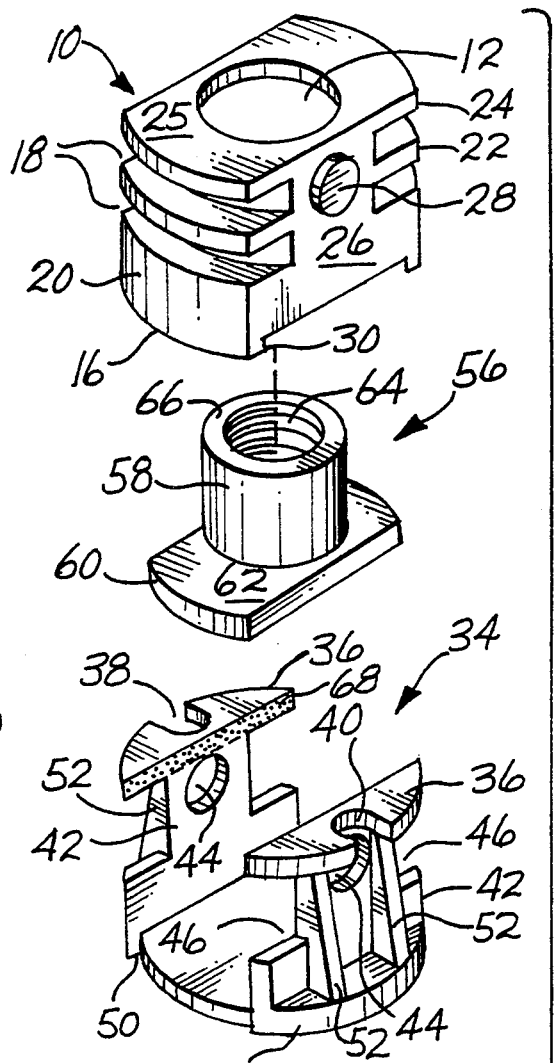
FIG. 2 is an exploded pictorial view of the fastener element shown in FIG. 1.
Figure 5:
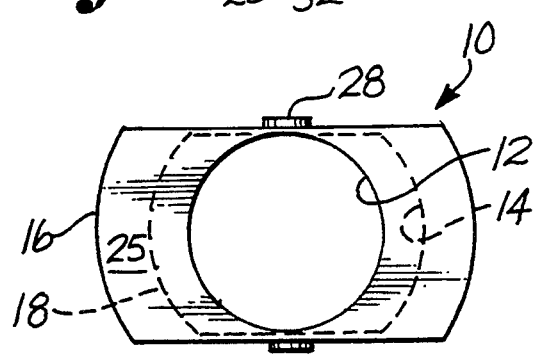
FIGS. 5 and 6 are top and bottom plan views, respectively, of the body portion shown in FIGS. 3 and 4.

Referring to FIGS. 1 and 2, the preferred embodiment of the fastener element 2 of the invention comprises a body 10, 34 having a first portion 10 and a second portion 34. The body 10, 34 defines an axial opening 12, 14 that receives a floating member 56. The two body portions 10, 34 are mechanically interlocked and, in a molded-in installation, cooperate to exclude binding material from the axial opening 12, 14. The floating member 56 is engaged by a screw fastener or the like to connect an object to the structure in which the fastener element 2 is installed. The floating member 56 and the axial opening 12, 14 are shaped and dimensioned to substantially prevent rotation of the member 56 in the opening 12, 14 while permitting radial movement of the member 56 in the opening 12, 14. The prevention of rotation facilitates engagement of the member 56 by a fastener. The radial movement automatically adjusts for misalignments between the structure and the object. The exclusion of binding material from the opening 12, 14 ensures that the capability for radial movement is maintained to thereby maintain the self-alignment capability.

The structure of the first body portion 10 can be seen in FIGS. 2–6, 13, and 14. The portion 10 has two circumferentially spaced sections 16 that form flow passageways 18 around the body 10, 34. Each section 16 has a plurality of flow control disks 20, 22, 24, between which the flow passageways 18 are formed. The inner or lower (as shown) disk 20 is relatively thick in the axial direction. The intermediate disk 22 and the outer or top (as shown) disk 24 each have about the same axial thickness. The axial opening 12, 14 is formed in the first body portion 10 and extends therethrough opening onto the bottom surface and the top radial end surface 25. Two opposite parallel chordal walls 26 extend between the flow control sections 16. A circular radial projection 28 is formed on each of the walls 26 for snap fitting the two body portions 10, 34 together, as described below. At the bottom of the body portion 10, axial projections 30 project downwardly from the periphery of the spaced arcuate sections 16. The recessed bottom surface of the body portion 10 defined by the axial projections 30 and the lower edges of the tangent walls 26 forms a radial shoulder 32 facing away from the radial end surface 25. This shoulder 32 defines the radial or lateral extent of the enlarged inner portion 14 of the axial opening 12, 14.

The second body portion 34 can best be seen in FIGS. 2 and 7–10. This portion 34 has at its upper end opposite arcuate outer flange portions 36. Each flange portion 36 has an opening 38, 40 extending radially into it from its periphery. One of these openings is a fill opening 38, and the other is a vent opening 40. A pair of flat legs 42 extend axially downwardly from the inner edge portions of the flanges 36. Each leg 42 has a hole 44 extending radially therethrough adjacent to the intersection of the leg 42 and the flange 36. A rectangular cutout 46 is formed in the leg 42 on each side of the hole 44 to provide flow around the body 10, 34, as described below. The bottom of the body portion 34 is formed by a circular disk 48. Each disk has a circumferential cutout 50 extending between the two legs 42, as best seen in FIGS. 2, 9, and 10. A pair of strengthening ribs 52 is formed on the flat outer surface of each of the legs 42. The two ribs 52 are on opposite sides of the radial hole 44 and taper radially inwardly as they extend axially outwardly from the bottom disk 48 to the outer flange 36. This tapering configuration minimizes any effect the ribs 52 might have on the flow of binding material around the body 10, 34 through the flow passageways 18 and the cutouts 46.

Figure 6:
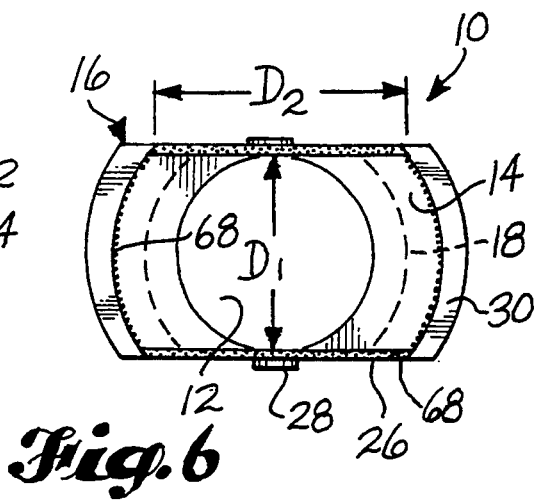

The axial opening 12, 14 is defined by the two body portions 10, 34. The opening 12, 14 extends through the first body portion 10 and has a closed inner end defined by the inner radial surface of the lower disk 48 of the second body portion 34. The overall configuration of the opening 12, 14 is T-shaped. The outer portion 12 that opens onto the radial end surface 25 is cylindrical and has a diameter $D_1$. The increased width inner portion 14 has a first lateral dimension at least as great as the diameter $D_1$. As shown in FIG. 6, the first lateral dimension is essentially equal to the diameter $D_1$. The inner portion 14 has a second lateral dimension $D_2$ perpendicular to and greater than the first lateral dimension $D_1$. This second lateral dimension $D_2$ is substantially parallel to the flat axial surfaces of the legs 42 of the second body portion 34. The depth or axial extent of the inner portion 14 is defined between the radial shoulder 32 on the first body portion 10 and the inner radial surface of the lower disk 48 on the second body portion 34. The floating member 56 is received into the axial opening 12, 14 formed by the two body portions 10, 34. Referring to FIGS. 2 and 11–14, the member 56 has an overall T-shaped configuration corresponding to the configuration of the opening 12, 14. The outer portion 58 of the member 56 is cylindrical and terminates in an outer radial end 66. A generally rectangular head 60 is formed on the inner end of the member 56. The edges of the head 60 along the lesser dimension are curved, as best seen in FIG. 11. The head 60 has a radial surface 62 facing its outer end for abutting the shoulder 32 on the first body portion 10, as described below. A threaded opening 64 extends through the member 56. The outer or top end of the opening 64 is aligned with and adjacent to the outer end of the cylindrical portion 12 of the axial opening 12, 14 for engaging a threaded fastener.

The assembly of the fastener element 2 may be accomplished quickly and easily. With the first body portion 10 held in an upside-down orientation, the floating member 56 is placed into the axial opening 12, 14. Then, the second body portion 34 is snapped over the first body portion 10 to mechanically interlock the two portions 10, 34. The first body portion 10 fits into the space defined between the two legs 42 of the second body portion 34. The radial projections 28 on the first body portion 10 snap into the holes 44 on the legs 42. The legs 42 have sufficient flexibility to permit this snap-fit assembly.

In the assembled fastener element 2, the tangent walls 26 of the first body portion 10 abut the flat inner surfaces of the legs 42 on the second body portion 34. The bottom surfaces of the tangent walls 26 abut the inner radial surface of the lower disk 48 of the second body portion 34. The axial projections 30 on the first portion 10 fit into the cutouts 50 on the lower disk 48. The projections 30 and lower disk 48 together form a circular flat bottom disk of the assembled element 2. At the upper end of the element 2, a second disk is formed by the outer or top disks 24 of the first body portion 10 in combination with the outer flanges 36 on the second body portion 34. The overall configuration of the assembled fastener element 2 is cylindrical with flow passageways extending around the circumference.

Preferably, an adhesive layer 68 is provided on key interfacing surfaces of the two body portions 10, 34 to exclude binding material from the axial opening 12, 14. In the preferred embodiment, adhesive 68 is provided on the bottom surfaces of the tangent walls 26 and the inner circumferential surfaces of the axial projections 30 of the first body portion 10 to exclude binding material from entering the inner portion 14 of the axial opening 12, 14. Additional adhesive is provided along the inner edge of the flanges 36 on the second body portion 34 to exclude binding material from the outer cylindrical portion 12 of the axial opening 12, 14.

The installation of the fastener element 2 in a honeycomb core panel 80 is illustrated in FIGS. 15–20. FIGS. 16–18 illustrate the preparation of the panel 80 for the installation. The panel 80 has a honeycomb core 82 sandwiched between skins 84. As shown in FIG. 16, an opening 86 is formed in one of the skins 84 and extends downwardly into the core 82 and terminates near the opposite skin 84. FIG. 17 illustrates the forming of the opening 86 using a cutting bit 90 of a known type. After the opening 86 is formed, a cavity 88 in the core 82 is formed by enlarging the opening inwardly of the skin opening 86. A reamer 92 of a known type, such as that shown in FIG. 18, may be used to form the cavity 88.

The fastener element 2 may be prepared for installation at about the same time as the panel 80. However, the assembly of the fastener element 2 which is a part of the preparation is preferably accomplished prior to the time of installation, and the assembled fastener element 2 is stored until it is needed. When the assembled element 2 is to be installed, a positioning tab 70 of the type shown in FIG. 15 is preferably used to assist in handling and positioning the element 2. The tab 70 has a pair of openings 72 on diametrically opposite portions thereof which align with the fill opening 38 and vent opening 40 in the fastener element 2. The tab 70 has a flat disk-like configuration with an angled handle 74 projecting radially outwardly and upwardly from a peripheral portion thereof. The diameter of the tab 70 is larger than the diameter of the opening 86 in the panel skin 84. The tab 70 has an adhesive layer 76 formed on its flat lower surface for removably securing it to the fastener element 2.

The tab 70 is positioned over the element 2 with the tab openings 72 aligned with the fill and vent openings 38, 40. Then, the tab 70 is pressed against the outer surface of the element 2 formed by the radial end surface 25 and the flanges 36. This removably secures the tab 70 to the element 2. The element 2 is picked up by grasping the tab handle 74 and is introduced into the cavity 88 in the panel 80 through the skin opening 86. Preferably, the diameter of the outer disk portion of the fastener element 2 formed by the radial end surface 25 and flanges 36 is dimensioned so that the disk 25, 36 fits snugly into the skin opening 86. The portion of the adhesive layer 76 on the tab 70 radially outward of the disk 25, 36 engages the outer surface of the skin 84 to hold the element 2 securely in position during the molding-in operation.

FIG. 19 illustrates potting material 96 being introduced into the cavity 88 by means of a nozzle 94 of a sealant gun inserted into the tab opening 72 that is aligned with the fill opening 38. As shown by the arrows in FIG. 19, the potting material 96 flows downwardly, circumferentially around the element 2 and upwardly to completely fill the cavity 88 around the fastener element 2. FIG. 20 illustrates the completed molding-in operation after the tab 70 has been removed. The anchoring portions 20, 22, 48 of the element 2 interlock with the hardened potting material 96 to anchor the element 2 into the structure formed by the panel 80 and the hardened material 96. In addition, the flat chord surfaces of the legs 42 and the ribs 52 help to prevent rotation of the element 2.

The potting material 96 may comprise various types of material but is preferably an epoxy resin potting material. The first and second body portions 10, 34 of the fastener element 2, which come into contact with the potting resin 96, are preferably made from an engineering plastic of a type to which the resin 96 will cohesively bond. The cohesive bond, in combination with the construction of the element 2 to have flow control disks 20, 22, flow passageways 18, and flat chord surfaces 42, results in an advantageous flow pattern of the resin 96 to provide a strong connection between the fastener element 2 and the panel 80. This cooperative relationship is the subject of and is described in detail in the applicant's U.S. Pat. No. 4,812,193. In the assembled element 2, the cutouts 46 in the legs 42 are aligned with the flow control disks 22 and the flow passageways 18 to allow free flow of potting material 96 out from the passageways 18 around the element body 10, 34. The tapering configuration of the strengthening ribs 52 minimizes any effect the presence of the ribs 52 might have on the free flow of potting material 96.

The manner in which the installed element 2 reacts fastener loads can best be understood by reference to FIGS. 13 and 14. The outer cylindrical portion 58 and the head 60 of the floating member 56 are received into the outer cylindrical portion 12 and inner increased width portion 14 of the axial opening 12, 14, respectively. The two portions 58, 60 of the floating member 56 are dimensioned to be significantly smaller than the axial opening portions 12, 14 into which they are received to allow the floating member 56 to move freely in any radial direction within the opening 12, 14. At the same time, the elongated configuration of the floating member head 60 and the inner opening portion 14 prevents any substantial rotation of the floating member 56 in the opening 12, 14. If some small amount of rotation occurs during engagement of a screw fastener in the threaded opening 64 in the floating member 56, the head 60 of the floating member 56 quickly engages the tangent walls 26 to prevent further rotation and facilitate the attachment of the screw fastener. The exclusion of the potting material 96 from the axial opening 12, 14 by the adhesive seals 68 ensures that the free radial movement of the floating member 56 is maintained after the fastener element 2 has been installed in the panel 80. FIG. 13 shows the floating member 56 at the limit of its radial movement in one direction.

To secure the panel 80 to an object, a screw fastener engages the object and is threadedly engaged into the threaded opening 64 in the floating member 56. Radial movement of the floating member 56 automatically adjusts for misalignments between the panel 80 and the object. After the connection between the panel 80 and the object has been made, forces exerted on the panel 80 by the object via the fastener are reacted by the fastener element 2. Axial loads are transmitted from the fastener to the floating member 56. Abutment of the upwardly facing radial surface 62 of the floating member head 60 against the shoulder 32 formed by the first body portion 10 transmits the loads from the floating member 56 to the body portion 10. Because of the positioning of the floating member head 60 and the abutting shoulder 32 at the inner end of the axial opening 10, 12, the major portion of the strength of the body portion 10 is employed to react the loads. This strengthens the connection between the object and the panel 80 and helps prevent damage to the element 2 and consequent compromise of the integrity of the connection. The security of the connection is further enhanced by the mechanical interlocking of the two body portions 10, 14, which transmits a portion of the load to the second body portion 34. The ability of the second portion 34 to carry the transmitted load is increased by the strengthening ribs 52.

Various features of the preferred embodiment described herein may be varied. Each of the first and second body portions 10, 34 is preferably an integral piece made from molded plastic. As noted above, the plastic is preferably an engineering plastic of a type to which the potting resin will cohesively bond. Since the floating member 56 does not contact the resin 96, it may be made from a variety of materials, including plastic or metal. Preferably, the floating member 56 is also an integral molded plastic piece. The illustrated interlocking portions of the body 10, 34, i.e. the radial projections 28 and the radial holes 44, are currently the preferred interlocking means. However, other types of interlocking means may also be used. An example of an alternative locking arrangement is one in which inwardly projecting lips on the axial projections 30 snap under the bottom of body portion 34. Another feature of the element 2 that may be varied is the configuration of the axial opening. As illustrated, the opening 12, 14 is a blind opening with an inner end closed by the lower disk 48. A through opening for receiving a through-type fastener could also be provided within the scope of the invention. In such case, the lower end of the body 10, 34 would preferably be provided with a means to exclude potting material from the lower end of the opening. For example, a lower end disk could be provided to snugly fit into an opening in the lower skin 84 of a panel 80.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A fastener element receivable into an opening in a structure adapted to cooperate with a screw fastener or the like to connect an object to the structure, said fastener element comprising:

a body including a first portion, and a second portion mechanically interlocked with said first portion; said portions together defining an axial opening having an outer end that opens onto a radial end surface of said body, and one of said portions having a radial shoulder facing away from said outer end and defining an increased width inner portion of said axial opening;

anchoring portions carried by said body that interlock with the structure to anchor the fastener element in the opening in the structure; and a floating member positioned in said axial opening in said body; said member including an engagement portion aligned with said outer end of said axial opening for engaging a fastener, an outer end positioned adjacent to and spaced inwardly from said outer end of said axial opening, and an opposite inner end including a head that is received in said inner portion of said axial opening and has a radial surface confronting said shoulder to transmit axial loads created by engagement of said member by a fastener from said member to said body;

said floating member and said axial opening being shaped and dimensioned to substantially prevent rotation of said member in said axial opening while permitting radial movement of said member in said axial opening to automatically adjust for misalignments between the structure and said object.

2. The fastener element of claim 1, in which each of said floating member and said axial opening is generally T-shaped and has a generally cylindrical outer portion with a diameter; and said inner portion of said axial opening and said head of said floating member each has a first lateral dimension at least as great as said diameter and a second lateral dimension perpendicular to and greater than said first lateral dimension.

3. For molded-in installation, by use of a binding material, into a cavity in a structure, a fastener element receivable into the cavity and adapted to cooperate with a screw fastener or the like to connect an object to the structure, said fastener element comprising:

a body including a first portion, and a second portion mechanically interlocked with said first portion; said portions together defining an axial opening having an outer end that opens onto a radial end surface of said body, and one of said portions having a radial shoulder facing away from said outer end and defining an increased width inner portion of said axial opening;

anchoring portions carried by said body that interlock with said binding material to retain the fastener element in position in the cavity; and a floating member positioned in said axial opening in said body; said member including an engagement portion aligned with said outer end of said axial opening for engaging a fastener, an outer end positioned adjacent to and spaced inwardly from said outer end of said axial opening, and an opposite inner end including a head that is received in said inner portion of said axial opening and has a radial surface confronting said shoulder to transmit axial loads created by engagement of said member by a fastener from said member to said body and to retain said member in said body;

said floating member and said axial opening being shaped and dimensioned to substantially prevent rotation of said member in said axial opening while permitting radial movement of said member in said axial opening to automatically adjust for misalignments between the structure and said object; and said first and second portions of said body cooperating to exclude said material from said axial opening to prevent hindrance of said radial movement by said material.

4. The fastener element of claim 3, in which each of said floating member and said axial opening is generally T-shaped and has a generally cylindrical outer portion with a diameter; and said inner portion of said axial opening and said head of said floating member each has a first lateral dimension at least as great as said diameter and a second lateral dimension perpendicular to and greater than said first lateral dimension.

5. For molded-in installation, by use of binding material, into a cavity in a structure, a fastener element receivable into the cavity and adapted to cooperate with a screw fastener or the like to connect an object to the structure, said fastener element comprising:

a body including a first portion, and a second portion mechanically interlocked with said first portion; said portions together defining an axial opening having an outer end that opens onto a radial end surface of said body, and one of said portions having a radial shoulder facing away from said outer end and defining an increased width inner portion of said axial opening;

anchoring portions carried by said body that interlock with said binding material to retain the fastener element in position in the cavity; and a floating member positioned in said axial opening in said body; said member including an engagement portion aligned with said outer end of said axial opening for engaging a fastener, an outer end positioned adjacent to said outer end of said axial opening, and an opposite inner end including a head that is received in said inner portion of said axial opening end has a radial surface confronting said shoulder to transmit axial loads created by engagement of said member by a fastener from said member to said body and to retain said member in said body:

said floating member and said axial opening being shaped and dimensioned to substantially prevent rotation of said member in said axial opening while permitting radial movement of said member in said axial opening to automatically adjust for misalignments between the structure and said object: and said first and second portions of said body cooperating to exclude said material from said axial opening to prevent hindrance of said radial movement by said material:

in which said body has outer flange portions with a fill opening and a vent opening extending through diametrically opposite peripheral portions thereof on opposite sides of said outer end of said axial opening; said one of said portions of said body includes two circumferentially spaced sections that form flow passageways around said body; and the other of said portions of said body includes reduced diameter substantially flat axial surfaces positioned circumferentially between said sections and radially inwardly of the fill opening and the vent opening, respectively, and axially extending strengthening ribs formed on said axial surfaces, said ribs tapering radially inwardly as they extend axially outwardly to facilitate flow of binding material around said body and through said passageways.

6. The fastener element of claim 5, in which each of said floating member and said axial opening is generally T-shaped and has a generally cylindrical outer portion with a diameter; and an inner portion of said axial opening and said head of said floating member each has a first lateral dimension at least as great as said diameter and a second lateral dimension perpendicular to and greater than said first lateral dimension; said second lateral dimension being substantially parallel to said axial surfaces.

* * * * *

UNITED STATES PATENT AND TRADEMARK OFFICE
CERTIFICATE OF CORRECTION

PATENT NO. : 5,378,099
DATED : January 3, 1995
INVENTOR(S) : Richard F. Gauron

It is certified that error appears in the above-identified patent and that said Letters Patent is hereby corrected as shown below:

Column 3, line 29, before "parts", insert -- like --.

Column 5, line 44, "The floating member" begins a new paragraph.

Claim 5, column 10, line 19, after "use of", insert -- a --;
    in line 51, "object:" should be -- object; --; and
    in line 55, "material:" should be -- material; --.

Signed and Sealed this

Fifteenth Day of August, 1995

Attest:

BRUCE LEHMAN

Attesting Officer

Commissioner of Patents and Trademarks